Sept. 18, 1928.
L. L. WAGNER
1,684,720
AUTOMOBILE HEADLIGHT
Filed Oct. 29, 1927
4 Sheets-Sheet 1
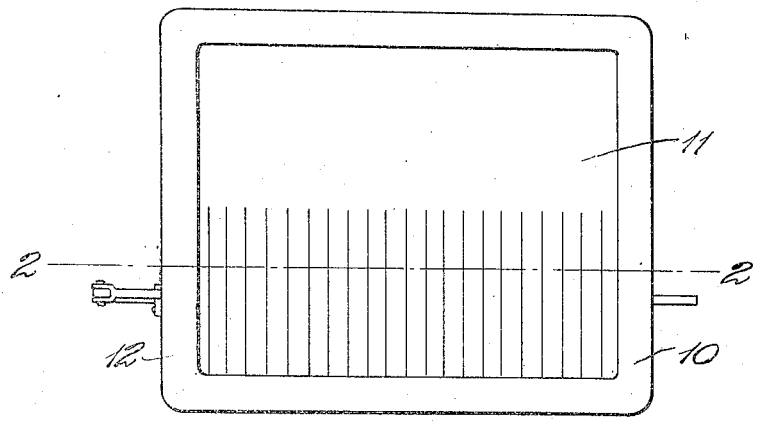
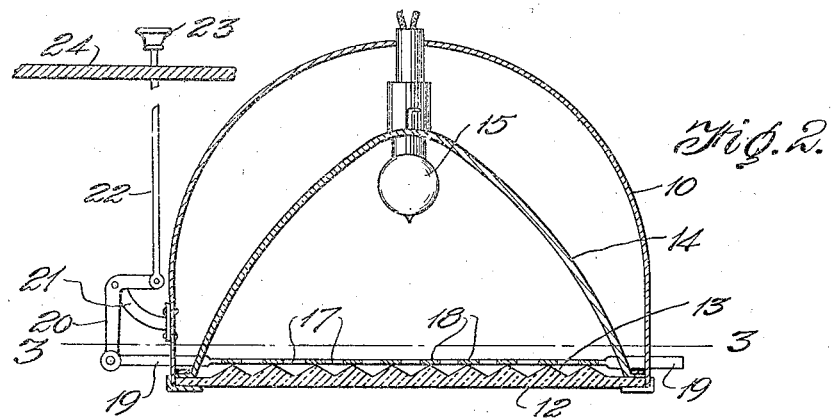
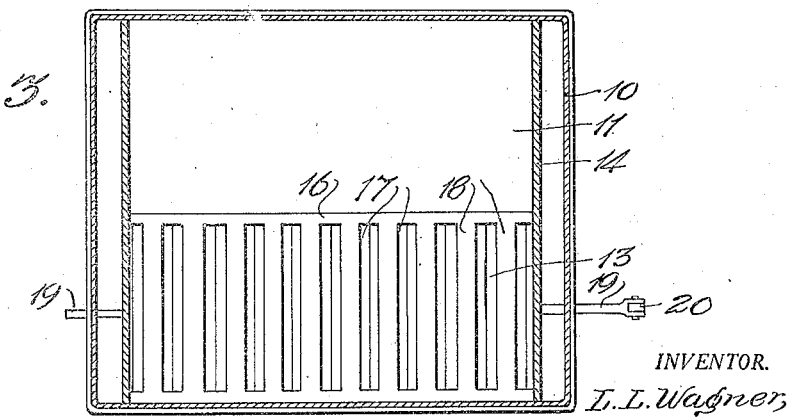
INVENTOR.
L. L. Wagner;
BY
ATTORNEY Sept. 18, 1928.

L. L. WAGNER 1,684,720

AUTOMOBILE HEADLIGHT

Filed Oct. 29, 1927

INVENTOR.
L. L. Wagner,
BY
ATTORNEY

Sept. 18, 1928.  L. L. WAGNER  1,684,720
AUTOMOBILE HEADLIGHT
Filed Oct. 29, 1927   4 Sheets-Sheet 3
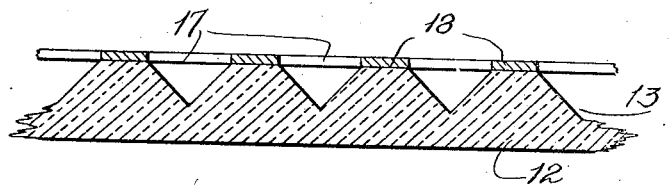
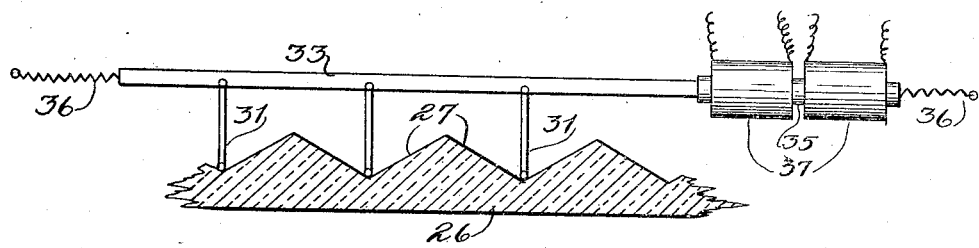
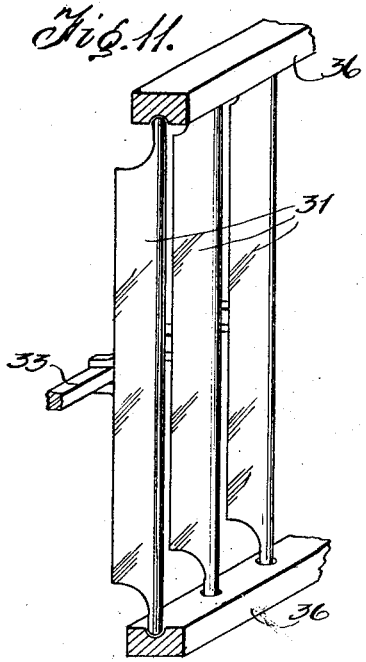
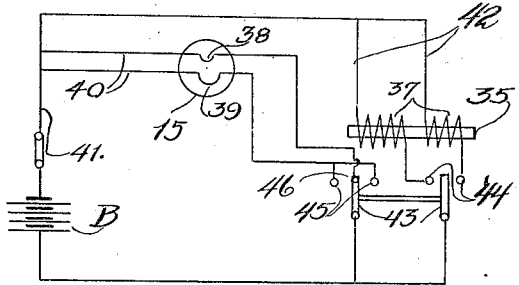
INVENTOR.
L. L. Wagner,
BY
ATTORNEY

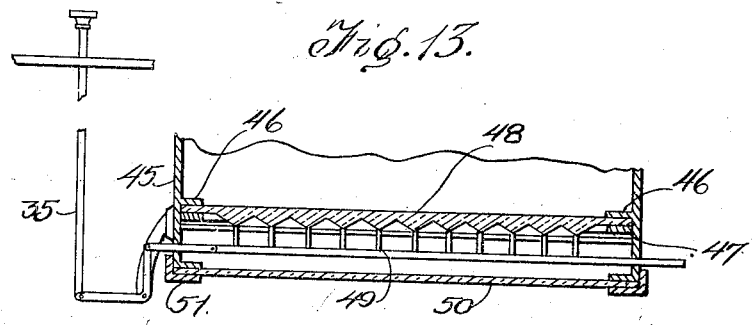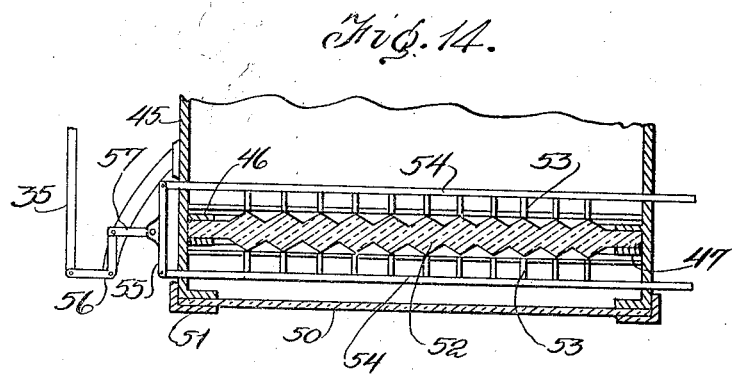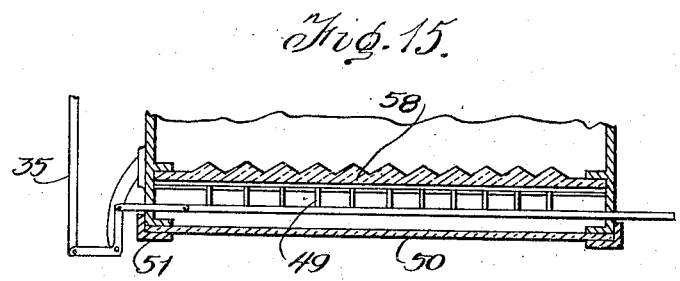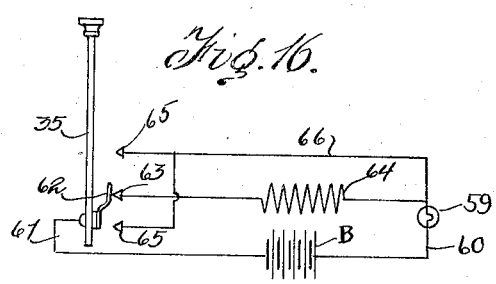

Patented Sept. 18, 1928.

1,684,720

UNITED STATES PATENT OFFICE.

LAWSON L. WAGNER, OF BALTIMORE, MARYLAND.

AUTOMOBILE HEADLIGHT.

Application filed October 29, 1927. Serial No. 229,631.

This invention relates to illumination and has special reference to an automobile headlight.

More particularly the invention relates to a headlight arranged to provide a laterally diffused beam.

In the use of headlights on automobiles vertical diffusion of the beam is objectionable because the light when thus diffused tends to blind an approaching driver. Lateral diffusion, however, is very desirable since by this means the beam is spread across the entire width of the road and not only is the road illuminated directly in front of the machine but also at the sides so that conditions at the side of the road may be observed and people, ditches, fences and other obstructions seen and avoided.

One important object of the present invention is to provide an improved arrangement of headlight lens wherein the beam will be so diffused as to properly illuminate the sides of the road.

However, with a beam diffused in this manner it sometimes happens that the height of the beam will be such that that portion thrown toward the passing side, the left in this country, will interfere with the vision of an approaching driver. Also it is sometimes desirable to cut off the diffusion from the opposite or right side.

A second important object of the present invention is to provide an improved combination of diffusing lens and shutter for cutting off diffusion to either side of the road as may be found desirable.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1 is a front view of a lamp arranged especially for lateral diffusion only.

Figure 2 is a section on the line 2—2 of Figure 1.

Figure 3 is a section on the line 3—3 of Figure 2.

Figure 9 is a detail section taken horizontally through the lens but showing a modification of the form shown in Figure 2.

Figure 10 is a section similar to Figure 8 but showing a modification of the shutter arrangement, the modification also showing electric means for operating the shutter.

Figure 11 is a detail perspective showing several shutter leaves and their supports.

Figure 12 is a wiring diagram showing how the bright lights are turned on as the shutters are thrown to cover one side or the other.

Figure 13 is a view similar to Figure 5 showing a modification in which the prismatic portions of the lens are arranged in front.

Figure 14 is a view similar to Figure 5 with double prismatic lens portions and a double shutter arrangement.

Figure 15 is a view similar to Figure 5 but having the shutter arranged externally of the lens.

Figure 16 is a view showing a modified wiring diagram wherein resistance is normally in series with the lamp but in which the full current is turned on to the lamp when the shutter is actuated to throw the beam to one side or the other.

Figure 4:
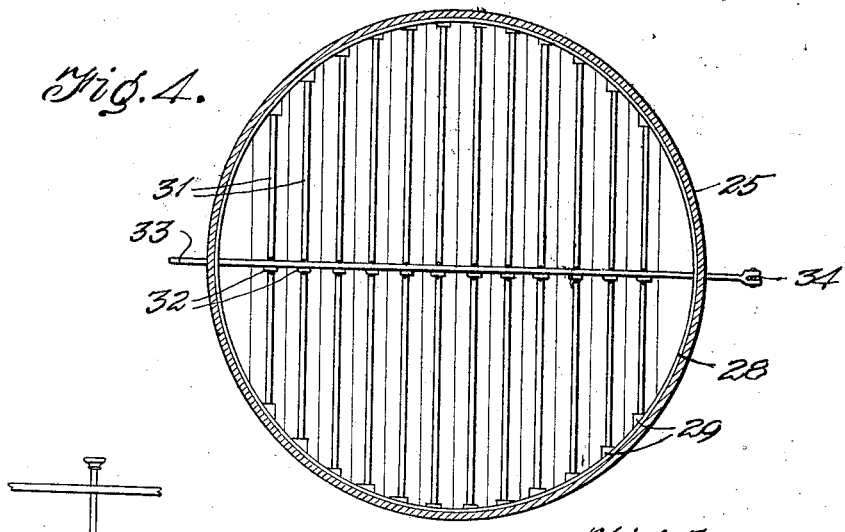
Figure 4 is a section similar to Figure 3 but showing a round form of lens.

In the form of the device shown in Figures 1 to 3 there is disclosed a rectangular form of headlight having a casing 10 provided at its front end with a lens or glass, the upper part of which may be a plain glass with parallel front and rear plane surfaces as shown at 11. At least the lower part of this glass, however, has a plane front surface 12 and a corrugated rear surface 13 in which the corrugations form vertically extending prismatic portions. These prisms are of triangular cross section with the bases of the triangles parallel to the front surface 12 and the apices directed rearwardly. Within the casing is a reflector 14 having a vertical reflecting surface and the reflector is preferably curved so as to form a parabola when seen in plan.

Also the usual lamp 15 is provided at the focus of this reflector, the arrangement thus effecting the projection of the rays from the reflector in forwardly directed parallel sheets, the lower parts of which are diffused laterally by the prisms. These being isosceles the rays are deflected and diffused equally to each side of the optical axis of the lamp.

In order to control the deflection and diffusion and cut off the light from one side or the other there is provided directly behind the glass or lens a grid 16 having alternate slots 17 and bars 18, the bars being normally centered behind the apices of the prisms. Each bar is of such width as to cover one-half of the prism in front of it when the grid is moved to the right or left. Projecting from each end of the grid is a stem 19 which passes through suitable guide slots in the reflector and casing and to one of these shanks is connected one arm of a bell crank 20 supported on a bracket 21. A reach rod 22 is connected to the remaining arm of this bell crank and is provided with a head 23 lying behind the dash 24. Thus by pulling or pushing on the reach rod the grid is moved to one side or the other. When moved to either side the bars of the grid cut the light from the reflector off from one-half of each prism while leaving the remaining half exposed to the reflected light. Accordingly all light then striking the prism will be deflected in the direction in which the grid has been moved owing to the well known optical laws governing light passing through prismatic bodies.

In the modified forms the grid construction is somewhat different, pivoted leaves being used. In Figure 4 such leaves are shown associated with an ordinary circular headlight having a casing 25 which supports a circular glass or lens having a plane front face 26 and prismatic rear face 27 with the same type of prisms as in the first form. Within the casing is a supporting ring 28 provided with bearings 29 receiving the gudgeons 30 of shutter leaves 31. These leaves are normally perpendicular to the front face of the glass and are of such width that upon rotation to position parallel to such front face they will cover one-half of each prism, their pivots being directly behind the apices of the prisms. Each leaf has a rearwardly extending lug 32 and these lugs are pivoted to a bar 33 one end of which extends through the casing 25 and is connected to one arm of a bell crank 34, the other arm being connected as before to a pull rod 35.

The form shown in Figure 10 is substantially the same as that of Figure 4 but the pivots of the shutters are positioned at the basal angles of the prisms. In this figure also it will be seen that at one end of the rod 33 is a solenoid core 35 and attached to the core and rod 33 are springs 36 which serve to yieldingly hold the shutters in normal position with both sides of the prisms exposed. On the core 35 is a pair of spaced windings 37 so disposed that energization of one winding draws the core in one direction and energization of the other winding moves the core in the opposite direction. Thus by selective energization of these cores the shutters are caused to cover desired sides of the prisms.

In Figure 11 is shown electrical connections by means of which not only may these cores be selectively energized but the lamp, which is arranged for two intensities, is caused to glow more brightly than normal when the shutters cover either side of the prisms so that the road is more brightly illuminated when passing a car than ordinarily. In this figure it will be seen that the lamp 15 is provided with a normal intensity filament 38 and a high intensity filament 39 connected in multiple through wires 40 to a switch controlled lead 41 extending from one terminal of a battery B. Also the windings 37 are connected in multiple through wires 42 to this lead. A double pole switch having contact arms 43 has these arms connected in multiple to the remaining terminal of the battery. One of the arms 43 moves between fixed contacts 44 connected to respective coils 37 while the other arm 43 moves between fixed contacts 45 connected in multiple to the filament 39, this arm normally engaging a contact 46 connected to the filament 38. Thus normally the standard intensity filament is energized but, upon movement of the switch to energize either solenoid the high intensity filament is energized.

Figure 6:
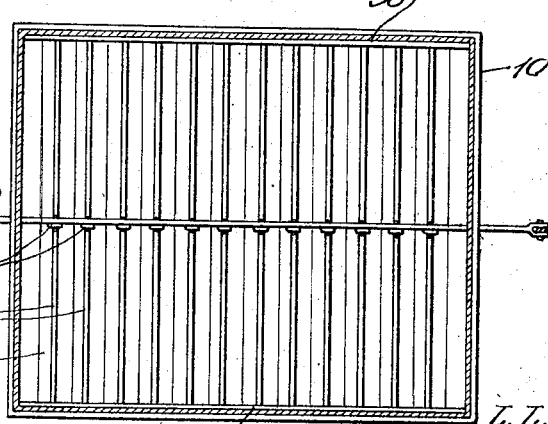
Figure 6 is a view similar to Figure 3 but showing the same modification as is illustrated in Figure 4.

In Figure 9 is shown a modification in which the apices of the prisms are flattened. The only difference between this form and the form shown in Figure 6 is that the latter has a rectangular casing and lens as in the first form and the ring 28 is replaced by upper and lower bearing bars 36.

In the further modifications of the invention shown in Figures 13, 14 and 15 it will be seen that the casing 45 is provided in spaced relation to its front edge with supports 46 against which rests the lens plate, the plate being held in position by a suitable ring 47. In the form shown in Figure 13 the lens plate is exactly the same as the lens plate shown in Figure 5 except that it has the prismatic portions turned outwardly, this arrangement is here shown at 48. Obviously this arrangement may be used either with the sliding or swinging shutter forms but for convenience there has been shown at 49 the shutter form which is used in connection with the arrangement in Figure 5 and this shutter form is operated by the rod 35 as before.

Since the shutter form 49 is placed in front of the lens plate 48 the housing or casing 45 is extended forwardly and a plain glass plate 50 is mounted on the front of the housing by a ring 51.

The same arrangement of housing or casing with the plain glass front is followed out in Figure 14 but in this case a lens plate 52 is provided which has oppositely disposed prismatic portions on both faces and a double arrangement of shutter plate 53 is used, there being one shutter plate in front and one behind the lens plate and the operating rods 54 for these two sets of shutters being connected by a cross bar 55 which is in turn connected by a bell crank 56 through a link 57 to the rod 35.

Figure 5:
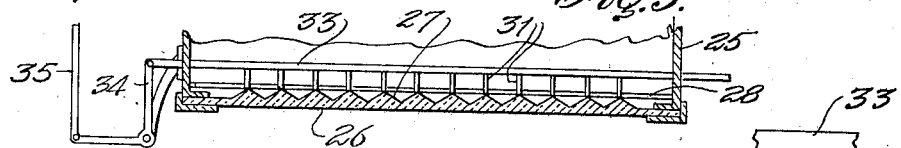
Figure 5 is a horizontal section of the form shown in Figure 4.
Figure 8:
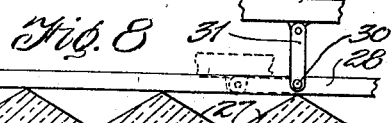
Figure 8 is an enlarged detail showing the manner in which the shutter members rock.
Figure 7:
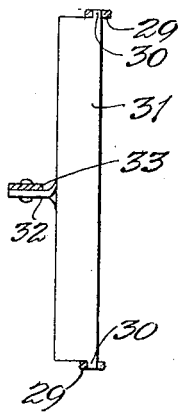
Figure 7 is a horizontal section of the form shown in Figure 6.

In the form shown in Figure 15 the arrangement is exactly that of Figure 13 except that the plate 58 is arranged as in Figure 5.

In the modification of the wiring arrangement illustrated in Figure 16 it will be noted that the lamp 59 is connected to one terminal of the battery B by a wire 60 while the other terminal of this battery is connected by a wire 61 to a moving contact 62 supported on some moving part of the device, as for instance the rod 35. This contact 62 normally rests on a contact 63 which is connected through resistance 64 to the lamp 59. At each side of the contact 63 is a further fixed contact 65 and these contacts are connected in multiple to the lamp through a wire 66. Thus normally the lamp 59 will have its intensity at the rating used in running but whenever the apparatus is moved to illuminate one or the other side of the road then the resistance will be cut out and the intensity of the lamp 59 will be increased.

It will be noted that the arrangement of the parts 31 and the bars 18 is that which may be called a shutter arrangement, said leaves or bars constituting shutter elements. It will also be noted that the normal positions of these leaves or bars in running is such that they are, in each instance, either directly behind or directly in front of the apices of the prismatic portions so that they are thus in optical alignment with these portions at such times when viewed from in front of the lamp.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. In a headlight, a headlight lens having a rear surface consisting of a series of vertically disposed triangular prismatic portions, a grid behind said lens and having vertical bars equal in number to the prismatic portions, the width of each bar being substantially one-half the width of each prismatic portion, said bars being normally disposed directly to the rear of the apices of the prismatic portions, said bars being movable simultaneously to cover one side and the other of each prismatic portion selectively, and means to move said bars simultaneously.

2. In a headlight, a headlight lens having a rear surface consisting of a series of vertically disposed triangular prismatic portions, a grid behind said lens and having vertical bars equal in number to the prismatic portions, the width of each bar being substantially one-half the width of each prismatic portion, said bars being normally disposed directly to the rear of the apices of the prismatic portions, said bars being movable simultaneously to cover one side and the other of each prismatic portion selectively, gudgeons at the top and bottom front corners of said bars, journals supporting said gudgeons, and means to move said bars simultaneously.

3. In a headlight, a headlight lens having a rear surface consisting of a series of vertically disposed triangular prismatic portions, a grid behind said lens and having vertical bars equal in number to the prismatic portions, the width of each bar being substantially one-half the width of each prismatic portion, said bars being normally disposed directly to the rear of the apices of the prismatic portions, said bars being movable simultaneously to cover one side and the other of each prismatic portion selectively, gudgeons at the top and bottom front corners of said bars, journals supporting said gudgeons, a tie bar having pivotal connection with each of the first mentioned bars at its rear edge, and means to move said tie bar transversely of the headlight and thereby rock the first mentioned bars simultaneously to one side and the other.

4. In a headlight, a headlight lens having a rear surface consisting of a series of vertically disposed triangular prismatic portions, a grid behind said lens and having vertical bars equal in number to the prismatic portions, the width of each bar being substantially one-half the width of each prismatic portion, said bars being normally disposed directly to the rear of the apices of the prismatic portions, said bars being movable simultaneously to cover one side and the other of each prismatic portion selectively, gudgeons at the top and bottom front corners of said bars, journals supporting said gudgeons, a tie bar having pivotal connections with each of the first mentioned bars at its rear edge, means to hold said bar yieldingly in normal position, and electro-magnetic means to move said tie bar transversely of the headlight and thereby rock the first mentioned bars simultaneously to one side and the other.

5. In a headlight, a headlight lens having a rear surface consisting of a series of vertically disposed triangular prismatic portions, a two intensity lamp behind said lens having normal and high intensity filaments, shutters arranged to cover selective sides of said prismatic portions, and electro-magnetic means for operating the shutters and simultaneously energizing the high intensity filament.

6. In a headlight, a headlight lens having at least one surface consist of a series of vertical disposed triangular prismatic portions, shutter means positioned in close proximity to a surface of said lens and having vertical shutter elements equal in number to the prismatic portions, the width of each element being substantially one-half the width of each prismatic portion, said elements being normally disposed in optical alignment with the apices of the prismatic portions, said elements being movable to cover one side and the other of each prismatic portion selectively, and means to move the elements simultaneously.

7. In a headlight, the combination consisting of a single source of illumination, means for diverting at least a portion of said light to one side, means for increasing the intensity of such diverted light and an operative connection between said means whereby actuation of one of said means produces actuation of the second means to effect said diversion and increase of intensity simultaneously.

8. In a headlight, the combination consisting of a single source of illumination, means for cutting off a portion of the projected rays of light from one side and diverting at least a portion of said light to the other side, means for simultaneously increasing the intensity of such diverted light and an operative connection between said means whereby actuation of one of said means produces actuation of the second means to effect said diversion and increase of intensity simultaneously.

9. In a headlight, the combination consisting of a prismatic lens, a single source of illumination, means for cutting off a portion of the projected rays of light from one side and diverting at least a portion of said light to the other side, means for simultaneously increasing the intensity of such diverted light and an operative connection between said means whereby actuation of one of said means produces actuation of the second means to effect said diversion and increase of intensity simultaneously.

In testimony whereof I affix my signature.

LAWSON L. WAGNER.